(12) United States Patent
Wang et al.

(10) Patent No.: US 7,414,718 B2
(45) Date of Patent: Aug. 19, 2008

(54) APPARATUS FOR MEASURING SPECTROGRAPHIC IMAGES

(75) Inventors: Hau Wei Wang, Taipei County (TW); Fu Shiang Yang, Hsinchu County (TW)

(73) Assignee: Industrial Technology Rsearch Institute, Hsinchu County (TW)

( * ) Notice: Subject to any disclaimer, the term of this patent is extended or adjusted under 35 U.S.C. 154(b) by 218 days.

(21) Appl. No.: 11/147,436

(22) Filed: Jun. 8, 2005

(65) Prior Publication Data

US 2006/0077385 A1    Apr. 13, 2006

(30) Foreign Application Priority Data

Oct. 11, 2004    (TW)    ............... 93130696 A

(51) Int. Cl.
*G01J 3/28*    (2006.01)
(52) U.S. Cl. ............................................ 356/328
(58) Field of Classification Search ........... 356/305, 356/328, 334
See application file for complete search history.

(56) References Cited

U.S. PATENT DOCUMENTS

| | | | |
|---|---|---|---|
| 3,842,274 A * | 10/1974 | Greene et al. ............ 250/330 |
| 4,995,721 A | 2/1991 | Krupa et al. |
| 5,297,555 A | 3/1994 | Martens |
| 5,424,827 A | 6/1995 | Horwitz et al. |
| 5,452,085 A | 9/1995 | Fancy et al. |
| 5,559,597 A | 9/1996 | Battey et al. |
| 5,579,106 A | 11/1996 | Kremer |
| 5,642,191 A | 6/1997 | Mende |
| 5,644,396 A | 7/1997 | Hopkins, II |
| 5,880,834 A | 3/1999 | Chrisp |
| 5,926,283 A | 7/1999 | Hopkins |
| 6,078,048 A | 6/2000 | Stevens et al. |
| 6,122,051 A | 9/2000 | Ansley et al. |
| 6,288,781 B1 | 9/2001 | Lobb |
| 6,552,788 B1 | 4/2003 | Castle |
| 6,744,505 B1 * | 6/2004 | Wang et al. .................. 356/326 |
| 7,016,037 B2 * | 3/2006 | Chrisp et al. ................ 356/328 |
| 7,199,877 B2 * | 4/2007 | Kehoe et al. ................. 356/305 |
| 2004/0129889 A1 * | 7/2004 | Barron .................... 250/370.08 |
| 2005/0162649 A1 * | 7/2005 | Kryszczynski et al. ....... 356/328 |

FOREIGN PATENT DOCUMENTS

JP    2000-352556    12/2000

* cited by examiner

*Primary Examiner*—Kara E. Geisel
(74) *Attorney, Agent, or Firm*—Volentine & Whitt, PLLC

(57) ABSTRACT

The present invention discloses an apparatus for measuring spectrum and image with high spatial resolution and spectral resolution. The apparatus comprises an imaging side telecentric lens for collecting light from an object, an optical slit positioned behind the imaging side telecentric lens, an aspheric lens for collimating lights from the optical slits, a dispersing device for separating the lights of different wavelengths into a plurality of sub-rays of different entrance angle, an achromatic lens for focusing the sub-rays, and an optical sensor for detecting the optical intensity of the sub-rays. The dispersing device can be a transmission or reflection diffraction grating, and the optical sensor may consist of a plurality of photo-detectors positioned in a two dimensional array.

14 Claims, 8 Drawing Sheets

APPARATUS FOR MEASURING SPECTROGRAPHIC IMAGES

BACKGROUND OF THE INVENTION (A) Field of the Invention

The present invention relates to an apparatus for measuring spectrographic images, and more particularly, to an apparatus for measuring spectrum and image with high spatial resolution and spectral resolution.

(B) Description of the Related Art

Generally speaking, an optical image technique can only measure spatial information of an object, i.e., the image of the object, but cannot acquire spectral information. To acquire both spatial and spectral information, the optical image technique needs extra spectral measuring technique. In other words, the spectral information can only be obtained when an additional light-splitting device is incorporated into an optical imaging system.

Conventional spectrographic images measuring technique can be classified as a point scanning and a global imaging. The point scanning take a relatively long measuring time for moving the probe or the object in two-dimensional manner and the measured data needs to be combined point by point, so the obtained image tends to distort. On the contrary, the wavelength resolution of the global imaging is limited for using light-splitting devices such as the optical filter. Consequently, the above-mentioned two methods are not suitable for measuring an object with a larger area rapidly and at high spatial/spectral resolution. Particularly, to measure an object with large area rapidly at high spatial/spectral resolution can be realized only by line scanning. The line scanning method allows acquiring the spectrographic images of the object just by moving in a single direction. Therefore, it has advantage of rapid measuring speed and the image mapping is simpler without distortion. In addition, the line scanning possesses a higher spectral resolution due to the dispersing device.

Conventional spectral image measuring apparatus possesses a line-shaped field of view (FOV), and the light spot of the object in the field of view after passing lens, reflecting mirror and dispersion device causes great aberration such as spherical aberration, coma aberration, and chromatic aberration. Theses aberration results in severe expansion and distortion of imaging light spots on 2D sensor, and adjacent imaging light spots is not distinguishable due to overlapping. Consequently, neither the spatial nor spectral resolution cannot be improved. Hence, it needs a new design for improving the resolution to develop the spectral machine vision.

FIG. 1 is an apparatus 10 for measuring spectrographic images according to the prior art. The apparatus 10 uses an optical collector 30 to guide optical energy 14 from points on the Y axis in the field of view of an object 12 to a spherical lens 18 after penetrating through a optical slit 16. The optical energy 14 is collimated by the spherical lens 18, and then enters into a diffraction grating 20 to disperse into rays 22 with different wavelengths and take-off angles. The ray 22 is focused on a charge-coupled device (CCD) 26 by a focusing lens 24 to simultaneously pick up the spatial and spectral information of the object 12. The opening of the slit 16 in FIG. 1 is parallel to Y-axis by the long side, and to X-axis by the short side.

FIG. 2(a) is a schematic diagram of the collector 30 according to the prior art. The collector 30 uses a multi-track fiber head 40 including several fibers 42 for close measurement of the object 12. The multi-track fiber 40 is inserted into an F-number matcher 43, and the optical energy in the three fibers 42 can present three light spot 46 as shown in FIG. 2 (b) at the optical slit 16 by the convergence of the reflecting mirror 44 and the concave reflecting mirror 45. However, the size and spatial resolution of the analyzable field of view on the object 12 depend on the arrangement, the diameter and quantity of the fiber 42 of the multi-track fiber 40. Consequently, available channels are limited, and the channel of the collector 30 in FIG. 2 is only 3. In addition, the optical energy 14 can be collected from the object 12 only by closing the multi-track fiber 40 to the object 12, which results in difficulty in measuring. Therefore, such a design is mainly used to measure the spectrographic images in an experiment at a lower resolution requirement.

FIG. 3 shows the operation of the optical collector 30 using an imaging lens 50 according to another embodiment of the prior art. The imaging lens 50 collects the optical energy 14 to the optical slit 16, and guides the optical energy 14 to a grating 56 via a spherical lens 54. The width of the optical slit 16 and the size of the CCD 26 determine the size of analyzable FOV of the object 12. However, off-axis light beams of the object 12 enter into the optical slit 16 via the imaging lens 50, and the principle ray and optical axis 58 form an included angle $\theta_1$, i.e., the principle ray is not parallel to the optical axis 58. As a result, the off-axis light beam causes a great de-collimation after passing the spherical lens 54, which cannot meet the requirement that the light beam enters into the grating 56 at a collimated manner, and the spectrum resolution present on CCD 26 is reduces. In addition, such a de-collimation will also cause extra aberration, which further reduces the spectral resolution on the CCD 26. Therefore, the channels available to measure cannot be increased due to the limitation of the spectral/spatial resolution. Hence, such a design can only be used in the comparison with low resolution, and cannot generate the spectrographic images with real high spatial/spectral resolution.

SUMMARY OF THE INVENTION

An apparatus for measuring spectrographic images comprises an imaging side telecentric lens for collecting optical energy from an object, an optical slit positioned behind the imaging side telecentric lens, an aspheric lens for collimating the light beam from the optical slit, a dispersing device for separating the light beam into a plurality of rays with different wavelengths and take-off angles, an achromatic lens for focusing the rays, and an optical sensor for detecting the optical intensity of the rays. The dispersing device can be a transmissible diffraction grating, and the optical sensor can be a CCD or 2D array sensor consisting of several photodetectors positioned in a two dimensional array.

Regardless of on-axis or off-axis, the optical energy in the field of view of the object can propagate into the dispersing device in a substantially collimated manner since the apparatus possesses the imaging side telecentric lens and the aspheric collimating mirror. In addition, the apparatus uses the achromatic lens to reduce the position difference caused by the aberration, and rays with different wavelengths in the field of view of the object can fonn a very small imaging spot on the optical sensor regardless of on-axis or off-axis. As a result, the optical energy with different wavelengths from the object can form imaging spots substantially without diffusion effect on the optical sensor. Consequently, the present invention can increase both the spectral resolution and the spatial resolution simultaneously, and therefore can be used to measure spectrographic images with high-density channel.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
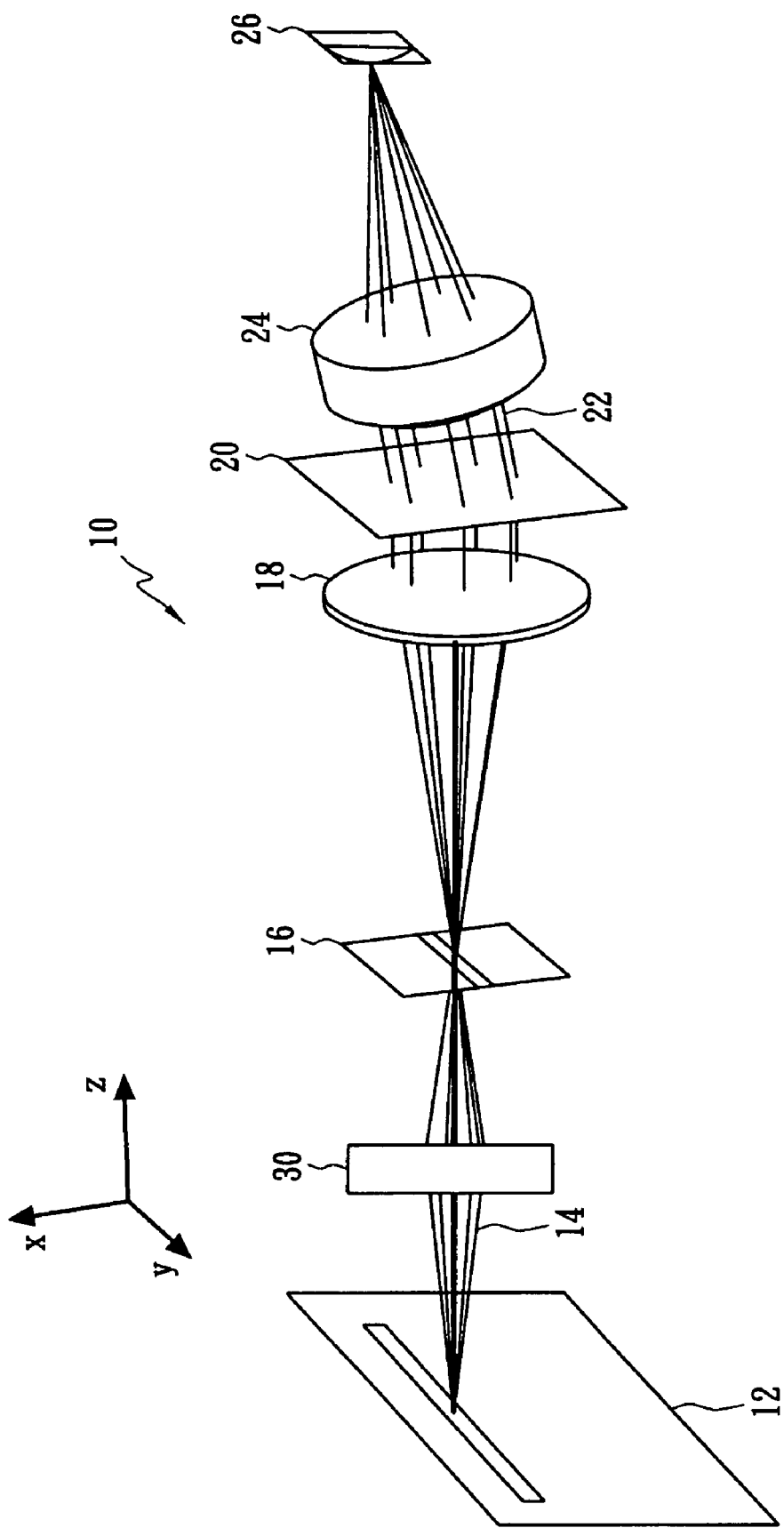
FIG. 1 is an apparatus for measuring spectrographic images according to the prior art.
Figure 2A:
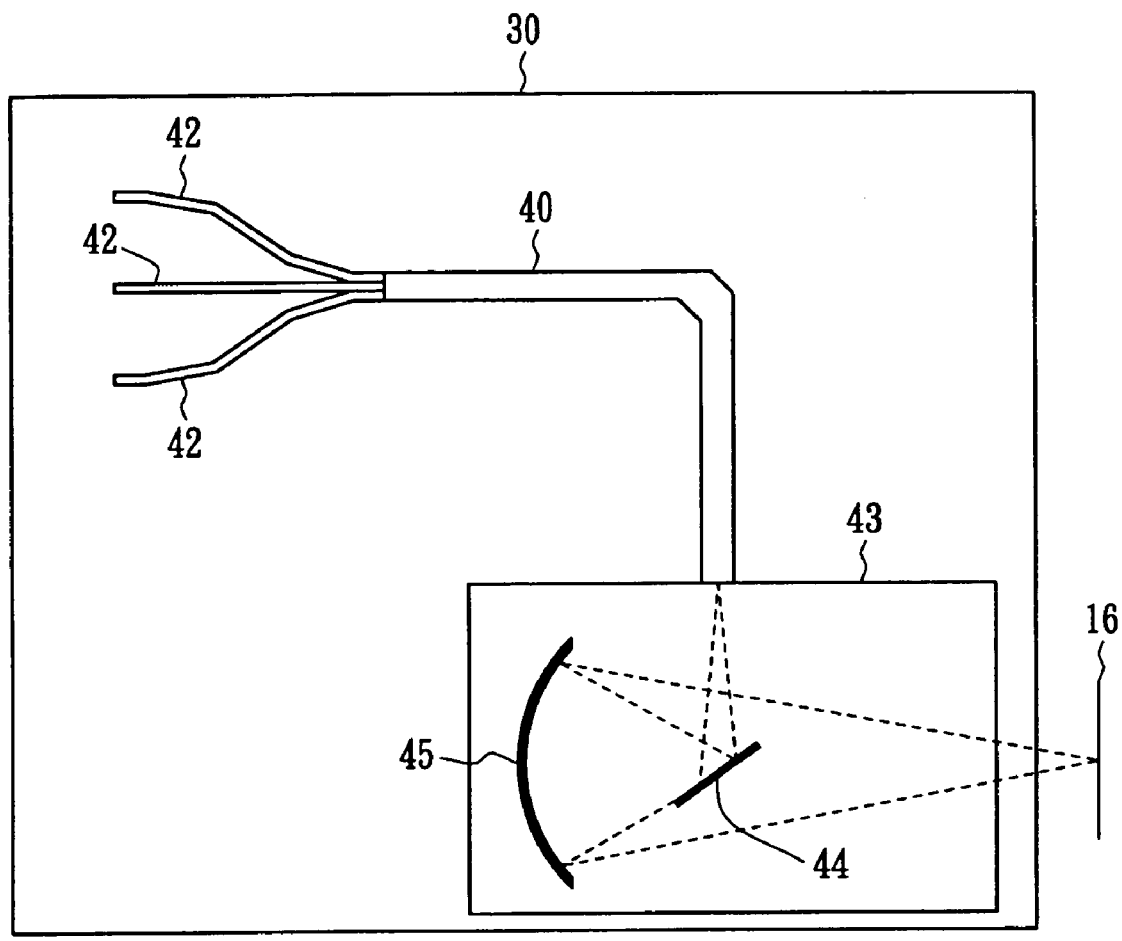
FIGS. 2(a) and 2(b) are schematic diagrams of a collector according to the prior art.
Figure 2B:
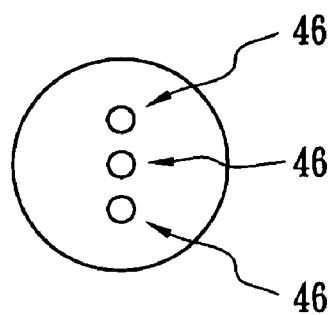
Figure 3:
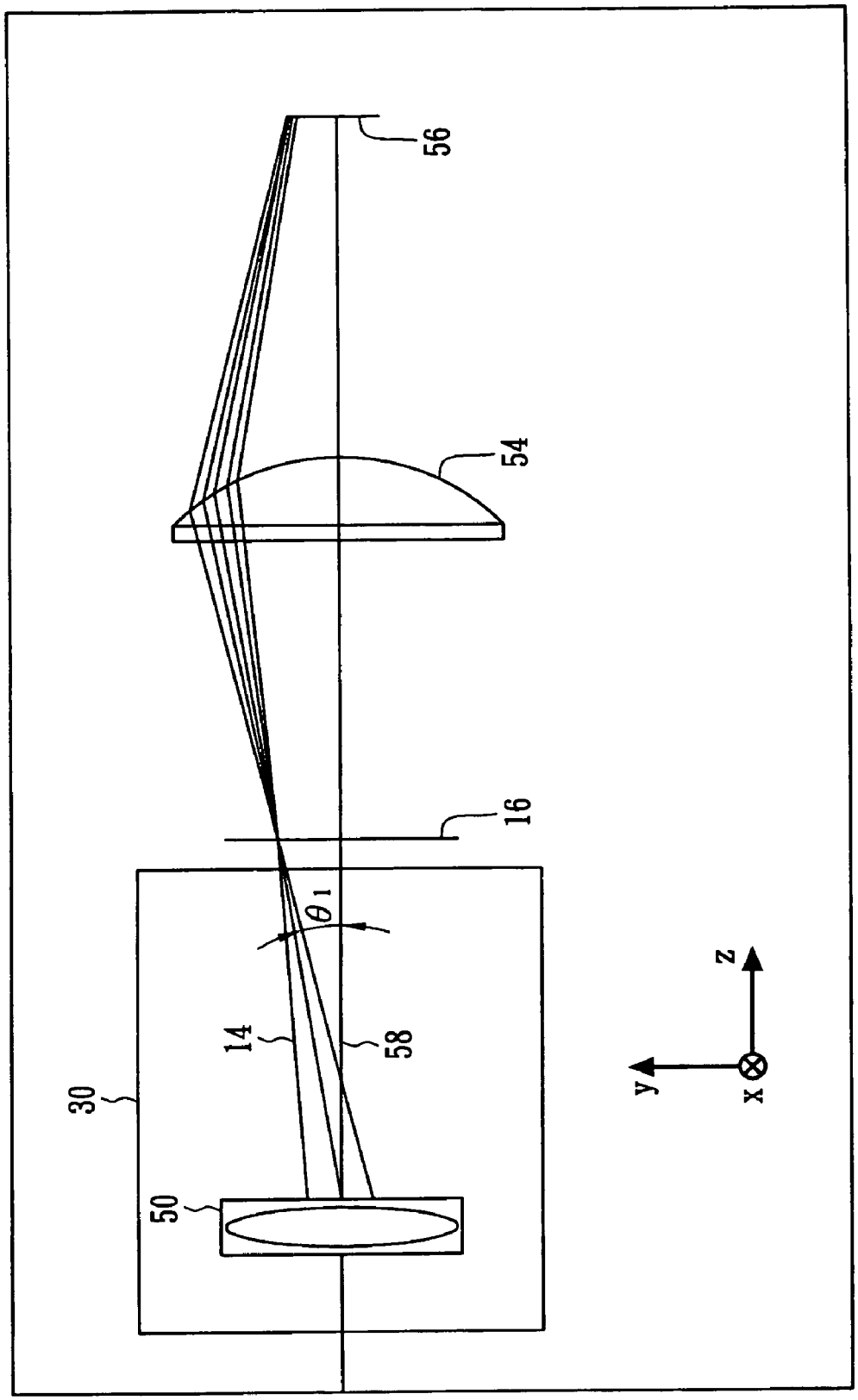
FIG. 3 shows the operation of the optical collector using an imaging lens according to another embodiment of the prior art.
Figure 4:
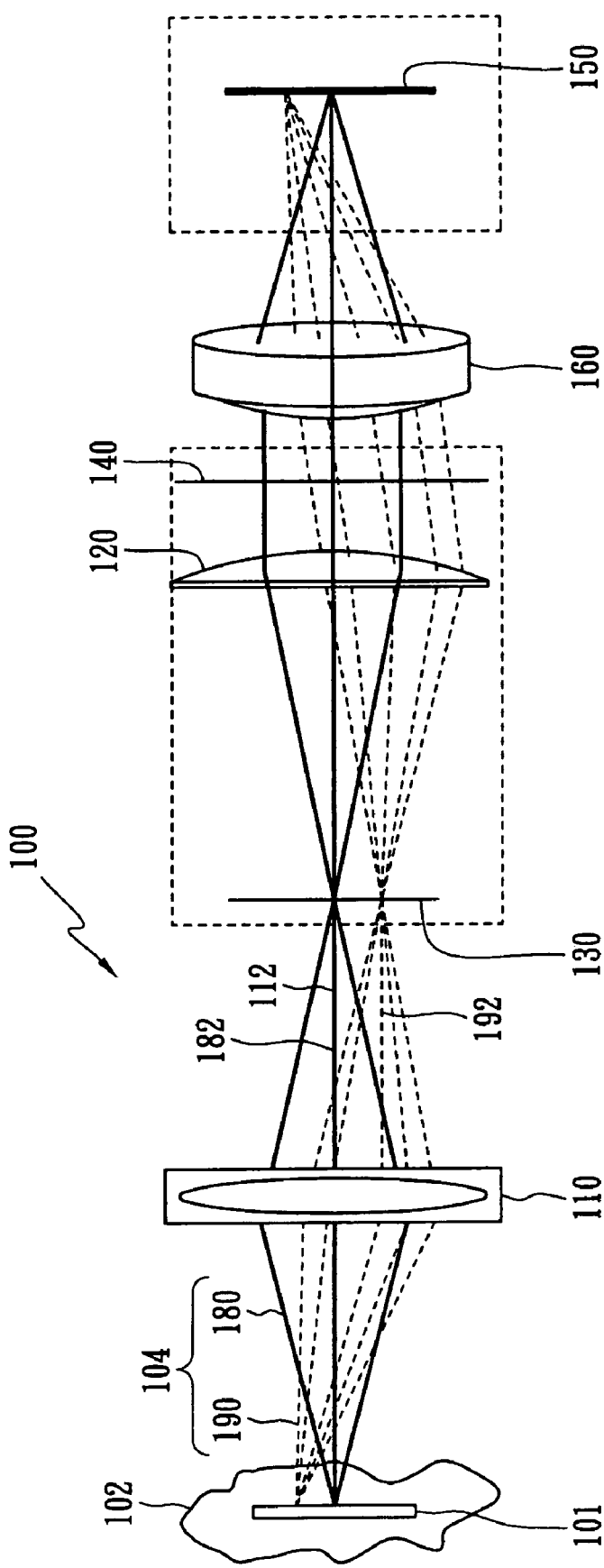
FIG. 4 illustrates an apparatus for measuring spectrographic images according to the first embodiment of the present invention.

FIG. 4 illustrates an apparatus 100 for measuring spectrographic images according to the first embodiment of the present invention. The apparatus 100 comprises an imaging side telecentric lens 110 for collecting optical energy 104 from an object 102, an optical slit 130 positioned behind the imaging side telecentric lens 110, an aspheric lens 120 for collimating the light beam from the optical slit 130, a dispersing device 140 for separating the light beam into a plurality of rays with different wavelengths and take-off angles, an achromatic lens 160 for focusing the rays, and an optical sensor 150 for detecting the optical intensity of the rays.

The dispersing device 140 can be a transmissible diffraction grating, and the optical sensor 150 can be a CCD or 2D array sensor. That is, the optical sensor 150 can consist of several photo-detectors arranged in 2D array. In FIG. 4, X-axis is dispersion axis, and the dispersing device 140 separates the optical energy 104 in the X-axis. The line-shaped FOV 101 of the object 102 depends on the size of the opening of the optical slit 130 and the amplification ratio of the apparatus 100.

Figure 5:
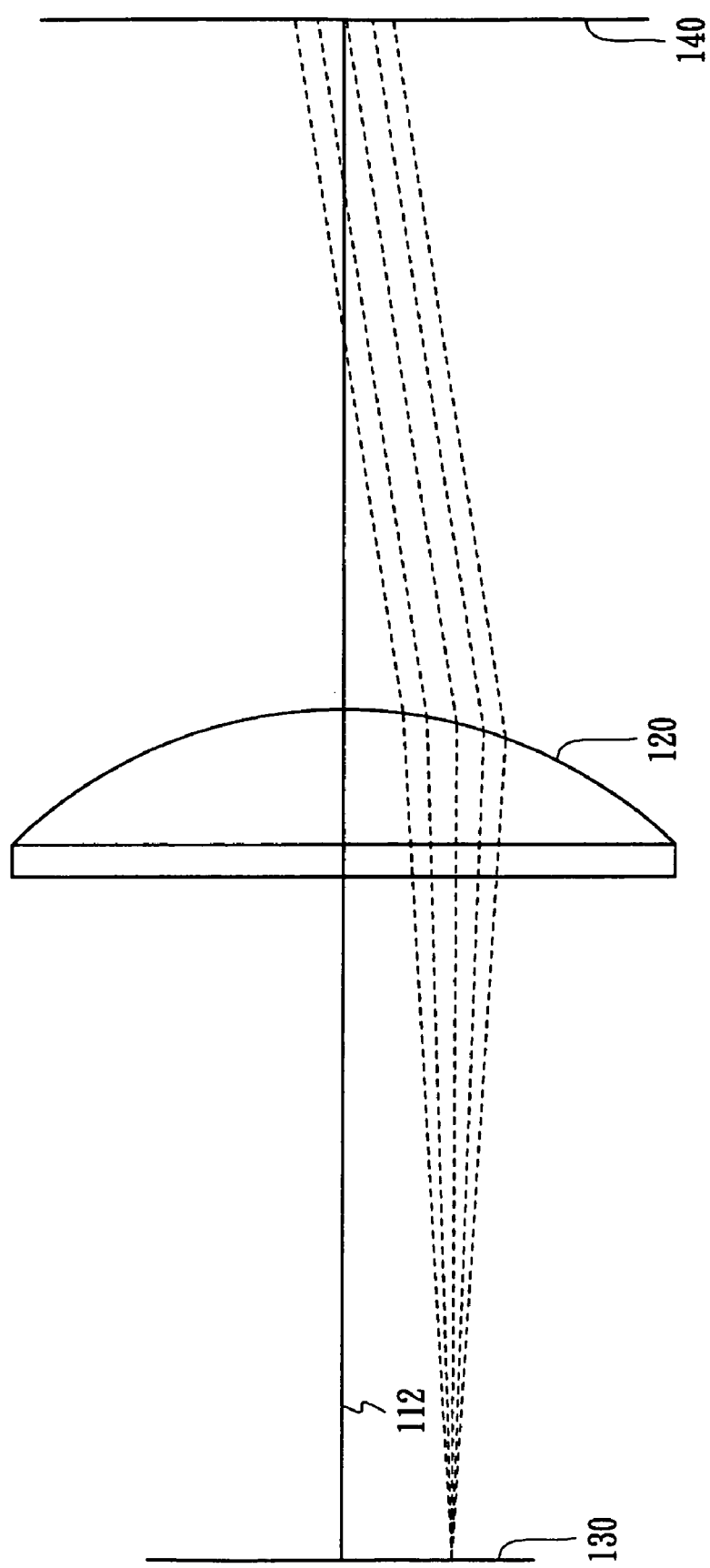
FIG. 5 shows the operation of the aspheric lens according to the present invention.

The optical energy 104 includes an on-axis light beam 180 and several off-axis light beams 190. The principle ray 182 of the on-axis light beam 180 coincides with the optical axis 112 of the apparatus 100. The imaging side telecentric lens 110 parallels the principle ray 192 of the off-axis light beam 190 to the optical axis 112, and then the principle ray 192 enters into the optical slit 130. Consequently, the off-axis light beam 190 can be easily corrected into an approximate collimated light beam (i.e. principle rays being parallel to each other) via the aspheric lens 120, and then enters into the dispersing device 140, as shown in FIG. 5. Similarly, the aspheric lens 120 also corrects the on-axis light beam 180 to an approximate collimated light and then enters into the dispersing device 140.

Figure 6:
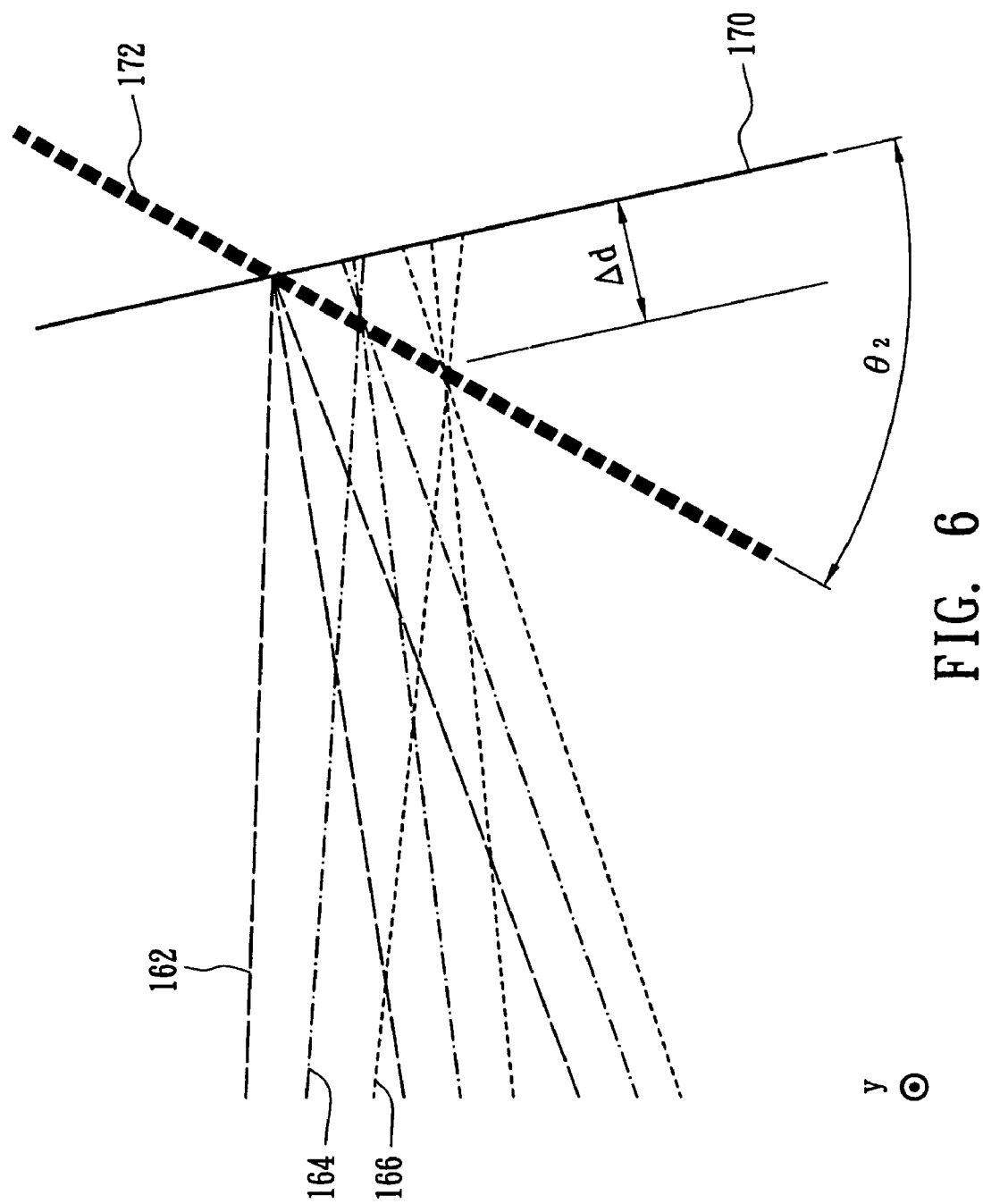
FIG. 6 shows the operation of the achromatic lens according to the present invention.

FIG. 6 shows the operation of the achromatic lens 160 according to the present invention. Three rays 162, 164 and 166 with different wavelengths such as 400 nm, 600 nm and 800 nm, respectively are focused at different positions on the rear. Due to aberration, there is a position difference $\Delta d$ between the imaging spot of the rays 162, 164 and 166. If the surface of the optical sensor 150 is right on the plane 170, the ray 162, 164 and 166 will form three imaging spots with different size on the optical sensor 150, wherein the sequence of the spot size is ray 166>ray 164>ray 162. In order to minimize the size difference of the imaging spots of ray 162, 164 and 166 on the optical sensor 150, the optical sensor 150 is rotated by a rotating angle $\theta_2$ to move its surface to the plane 172. However, rotating the optical sensor 150 makes it more different on assembling the optical device of the apparatus 100. The achromatic lens 160 is positioned between the aspheric lens 120 and the optical sensor 150, which will decrease the imaging spot position difference $\Delta d$ caused by the aberration and allow the rays 162, 164 and 166 with different wavelengths to form imaging spots with similar size on the optical sensor 150.

In short, the present invention parallels the optical energy 104 from the object 102 via the imaging side telecentric lens 110 and collimates the light beam from the imaging side telecentric lens 110 via the aspheric lens 120. Particularly, the imaging side telecentric lens 110 parallels the principle ray 192 of the off-axis light 190 to the principle ray 182 of the on-axis light beam 180. The aspheric lens 120 parallels all rays of the on-axis light beam 180 to its principle ray 182, and parallels all rays of the offset axis light beams 190 to its principle ray 192.

Figure 7:
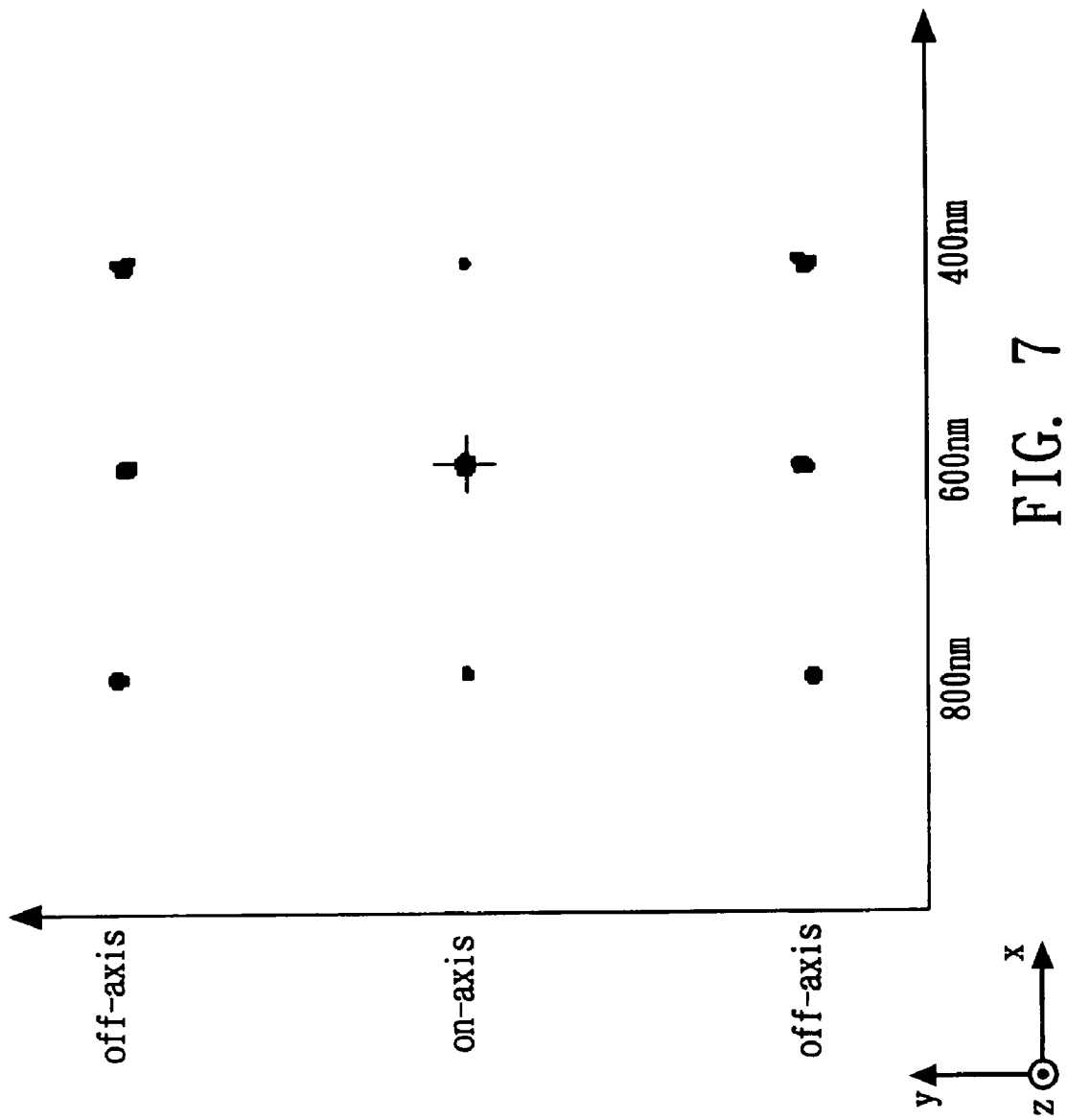
FIG. 7 shows imaging spots of the apparatus according to the first embodiment of the present invention.

FIG. 7 shows imaging spots of the apparatus 100 according to the first embodiment of the present invention. Regardless of on-axis or off-axis, the optical energy 104 in the FOV 101 of object 102 can propagate into the diffraction grating 140 in a substantially collimated manner since the apparatus 100 uses the imaging side telecentric lens 110 and the aspheric collimating mirror 120. In addition, since the achromatic lens 160 can reduce the position difference caused by the aberration, rays with different wavelengths in the FOV 101 of object 102 can form a very small imaging spot on the optical sensor regardless of on-axis or off-axis. In other words, the optical energy 104 with different wavelengths from the object 102 can form imaging spots substantially without diffusion effect on the optical sensor 150.

Figure 8:
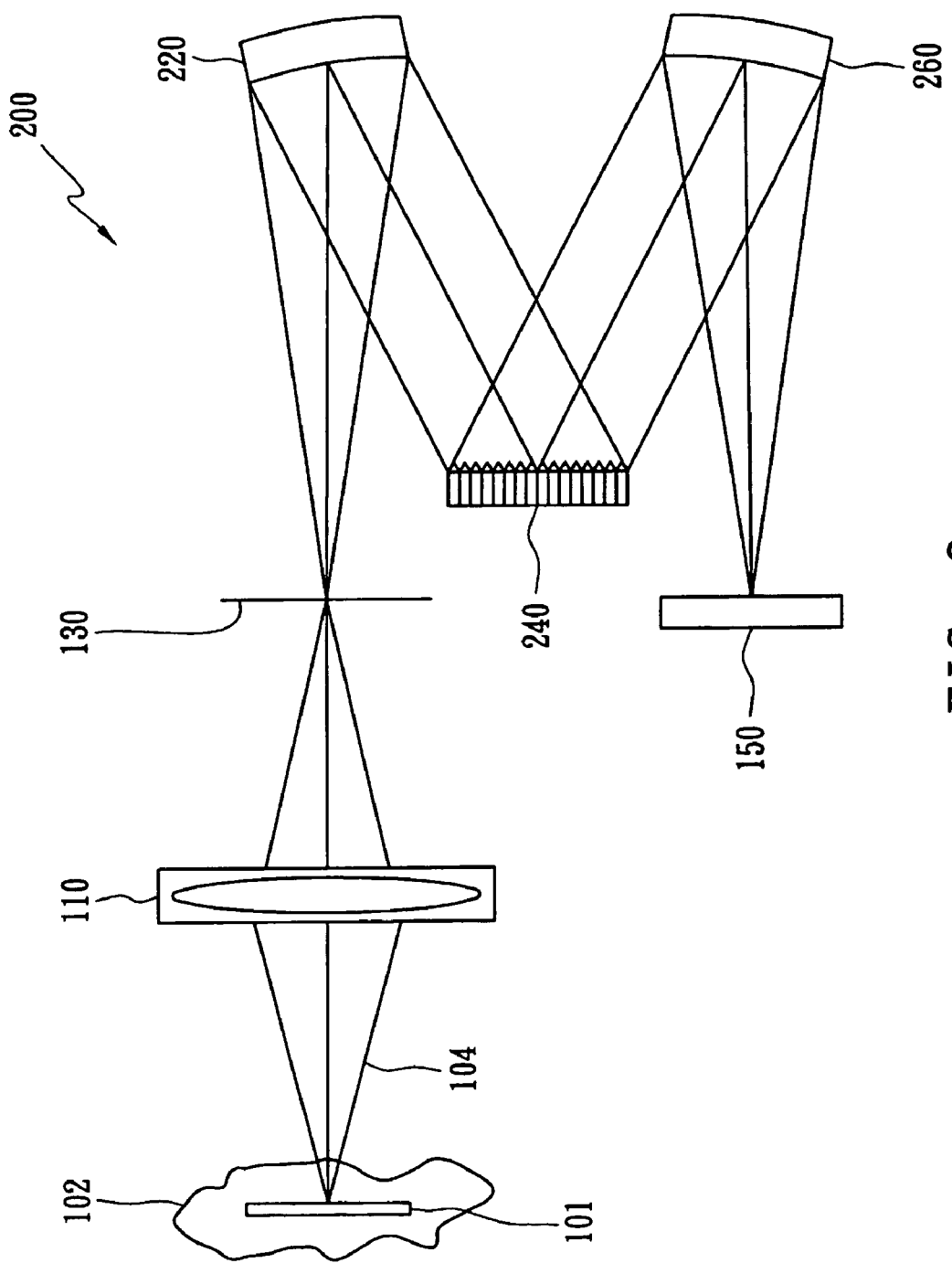
FIG. 8 illustrates an apparatus for measuring spectrographic images according to the second embodiment of the present invention.

FIG. 8 illustrates an apparatus 200 for measuring spectrographic images according to the second embodiment of the present invention. Compared to the apparatus 100 in FIG. 4, which uses a transmissible architecture, the apparatus 200 in FIG. 8 uses a reflective architecture. Particularly, the apparatus 200 uses a reflective aspheric lens 220, a reflective diffraction grating 240 and a reflective mirror 260.

Compared to the prior art, the present invention can increase both the spectral resolution and the spatial resolution simultaneously; therefore, it can be used to measure spectrographic images with high-density channel.

The above-described embodiments of the present invention are intended to be illustrative only. Numerous alternative embodiments may be devised by those skilled in the art without departing from the scope of the following claims.

What is claimed is:

1. An apparatus for measuring spectrographic images, comprising:

an imaging side telecentric lens for collecting optical energy from an object, the optical energy including a plurality of light beams;

an aspheric lens for collimating the light beams from the imaging side telecentric lens;

a dispersing device for separating the light beams into a plurality of rays with different wavelengths;

an optical sensor for detecting the optical intensity of the rays; and an achromatic lens positioned between the dispersing device and the optical sensor.

2. The apparatus for measuring spectrographic images of claim 1, further comprising an optical slit positioned between the imaging side telecentric lens and the aspheric lens.

3. The apparatus for measuring spectrographic images of claim 1, wherein the optical sensor is a charge-coupled device.

4. The apparatus for measuring spectrographic images of claim 1, wherein the optical sensor comprises a plurality of photo-detectors positioned in a two-dimensional array manner.

5. The apparatus for measuring spectrographic images of claim 1, wherein the dispersing device is a diffraction grating.

6. The apparatus for measuring spectrographic images of claim 1, wherein the dispersing device is a transmissible diffraction grating.

7. The apparatus for measuring spectrographic images of claim 1, further comprising a reflection mirror positioned on the optical path of the rays, wherein the dispersing device is a reflective diffraction grating, and the aspheric lens is a reflective aspheric lens.

8. A method for measuring spectrographic images, comprising steps of:
   paralleling optical energy including a plurality of light beams from an object to an optical axis;
   collimating the light beams of the optical energy;
   dispersing the light beams into a plurality of rays with different wavelengths; and
   reducing a focus position difference between the rays by using an achromatic lens;
   detecting the optical intensity of the rays.

9. The method for measuring spectrographic images of claim 8, wherein the optical energy includes an on-axis light beam and a plurality of off-axis light beams, and the step of paralleling optical energy including a plurality of light beams from an object to an optical axis is to parallel a principle ray of the off-axis light beams to a principle ray of the on-axis light beam.

10. The method for measuring spectrographic images of claim 9, wherein the light beams includes a plurality of rays, and the step of collimating the light beams of the optical energy is to parallel all the rays of the on-axis light beam to the principle ray of the on-axis light beam and to parallel all the rays of the off-axis light beams to the principle ray of the off-axis light beams.

11. An apparatus for measuring spectrographic images, comprising:
   an imaging side telecentric lens for collecting optical energy from an object, the optical energy including a plurality of light beams;
   an aspheric lens for collimating the light beams from the imaging side telecentric lens;
   a transmissible diffraction grating for separating the light beams into a plurality of rays with different wavelengths; and
   an optical sensor for detecting the optical intensity of the rays.

12. The apparatus for measuring spectrographic images of claim 11, further comprising an optical slit positioned between the imaging side telecentric lens and the aspheric lens.

13. The apparatus for measuring spectrographic images of claim 11, wherein the optical sensor is a charge-coupled device.

14. The apparatus for measuring spectrographic images of claim 11, wherein the optical sensor comprises a plurality of photo-detectors positioned in a two-dimensional array manner.

* * * * *

UNITED STATES PATENT AND TRADEMARK OFFICE
CERTIFICATE OF CORRECTION

| | | |
|---|---|---|
| PATENT NO. | : 7,414,718 B2 | Page 1 of 1 |
| APPLICATION NO. | : 11/147436 | |
| DATED | : August 19, 2008 | |
| INVENTOR(S) | : Hau Wei Wang et al. | |

It is certified that error appears in the above-identified patent and that said Letters Patent is hereby corrected as shown below:

On the cover page, item (73) (Assignee), change "Rsearch" to --Research--.

Signed and Sealed this

Eighteenth Day of November, 2008

JON W. DUDAS
*Director of the United States Patent and Trademark Office*